United States Patent
Ramirez, Jr.

(10) Patent No.: US 9,681,596 B2
(45) Date of Patent: Jun. 20, 2017

(54) ROW MAKING TOOL

(71) Applicant: Adalberto Ramirez, Jr., Lyford, TX (US)

(72) Inventor: Adalberto Ramirez, Jr., Lyford, TX (US)

( * ) Notice: Subject to any disclaimer, the term of this patent is extended or adjusted under 35 U.S.C. 154(b) by 48 days.

(21) Appl. No.: 15/044,840

(22) Filed: Feb. 16, 2016

(65) Prior Publication Data

US 2016/0157408 A1    Jun. 9, 2016

Related U.S. Application Data

(63) Continuation-in-part of application No. 14/138,693, filed on Dec. 23, 2013, now abandoned.

(60) Provisional application No. 61/716,972, filed on Oct. 22, 2012.

(51) Int. Cl.
*A01B 1/10* (2006.01)
*A01C 5/06* (2006.01)

(52) U.S. Cl.
CPC ............... *A01B 1/10* (2013.01); *A01C 5/062* (2013.01)

(58) Field of Classification Search
CPC .. A01B 1/06; A01B 1/065; A01B 1/08; A01B 1/10; A01B 1/12; A01B 39/14; A01B 19/00; A01B 13/02
See application file for complete search history.

(56) References Cited

U.S. PATENT DOCUMENTS

| | | | | |
|---|---|---|---|---|
| 149,154 A | * | 3/1874 | Rabb | A01B 1/06 172/246 |
| 424,244 A | * | 3/1890 | Adsit | A01B 1/08 172/381 |
| 645,702 A | | 3/1900 | Arlaud | |
| 677,405 A | * | 7/1901 | Ferris et al. | A01B 1/12 172/380 |
| 692,649 A | * | 2/1902 | Fischer | A01B 1/06 172/192 |
| 695,499 A | * | 3/1902 | Sheffield et al. | A01B 1/06 172/358 |
| 1,292,704 A | * | 1/1919 | Caviness | A01B 1/06 172/372 |
| 1,309,228 A | * | 7/1919 | Tellin | A01B 1/222 172/373 |
| 1,414,087 A | * | 4/1922 | Kenny | A01D 7/10 172/373 |
| 1,471,982 A | * | 10/1923 | Savage | A01B 1/06 172/374 |
| 1,788,971 A | * | 1/1931 | Arndt | A01B 1/06 172/373 |

(Continued)

*Primary Examiner* — Robert Pezzuto
*Assistant Examiner* — Jessica H Lutz
(74) *Attorney, Agent, or Firm* — M. Susan Spiering; Ferrell's, PLLC (57) ABSTRACT

A hand-pulled garden row making tool includes a set of blades that are attached to a rail. The rail is attached to an elongated shaft coupled to a pull handle. The wide pull handle allows the tool to be easily pulled and turned to give the tool a continuous, rapid movement capability. The blades enable the user to create multiple sets of deep, straight, and evenly spaced rows of furrows with corresponding rows of mounds, each row of proportional depth, height, and width. The tool facilitates the design of a garden layout plan, the seeding process, the harvesting process, and the conservation of irrigation water.

8 Claims, 5 Drawing Sheets

(56) References Cited

U.S. PATENT DOCUMENTS

| | | | | |
|---|---|---|---|---|
| 1,875,159 A | * | 8/1932 | Rowe | A01B 1/06 |
| | | | | 172/136 |
| 1,998,195 A | * | 4/1935 | Jenny | A01B 1/06 |
| | | | | 172/380 |
| 2,019,639 A | * | 11/1935 | Wolf | A01B 1/06 |
| | | | | 172/378 |
| 2,429,120 A | * | 10/1947 | Brandt | A01B 1/12 |
| | | | | 172/375 |
| 3,332,376 A | | 7/1967 | Etal, Jr. | |
| 4,484,635 A | | 11/1984 | Sidlo | |
| 4,865,133 A | * | 9/1989 | Dawley | A01B 1/08 |
| | | | | 172/380 |
| 5,372,205 A | | 12/1994 | Velez | |
| 2005/0205271 A1 | * | 9/2005 | Prado | A01B 1/10 |
| | | | | 172/329 |

* cited by examiner

100, 000 Kbytes

ROW MAKING TOOL

CROSS REFERENCE TO RELATED APPLICATION(S)

This is a continuation in part, non-provisional patent application based on co-pending U.S. Non Provisional patent application Ser. No. 14/138,693 titled "Row Making Tool", filed on Dec. 23, 2013, which claims priority to Provisional Application No. 61/716,972 filed on Oct. 22, 2012, the disclosure and contents of all cases, which is incorporated herein by reference in their entirety.

BACKGROUND

Field of the Invention

The invention relates generally to hand tools designed to build straight, uniform, evenly spaced, and proportionally sized row furrows and mounds for planting seeds in a home garden plot.

Prior to embodiments of the disclosed invention, making garden rows in home gardens was a difficult, labor intensive, and a slow process. There were no easy to use tools designed to quickly create straight, evenly spaced and ready to plant garden rows that would facilitate the seeding process. There have been many attempts to build a tool for such a purpose in the form of a hand operated cultivator. Cultivators however do not create rows as much as they merely till soil. In addition, there are numerous problems that make these types of tools inefficient for building garden rows.

First, a cultivator is a tool designed to prepare the soil for planting by turning up the soil to remove weeds and grasses by the roots. And further, to remove weeds and grasses by the roots from in between rows of existing crops. To remove any vegetation by the roots implies that the ground must have received sufficient water and must have remained undisturbed for a period of time that was long enough for the grasses or weeds to grow root systems. Thus, the ground had to have become hardened or denser to some extent. To remove grasses and weeds from hardened soil with a hand operated cultivator, a user must possess enough personal strength and stamina in order to push or pull a multi-bladed tool with enough force so that the blades can break through a dense or hardened surface and sink themselves down into the ground while the tool is being pushed or pulled through the soil in a continuous effort.

Cultivators with typical sharp plow-like blades that point downward like those found in U.S. Pat. No. 1,309,228 are designed to cut into the ground and will tend to snag on roots, rocks, or hard clumps of dirt, which will cause the tool to come to an abrupt stop if a tip snags, or if multiple tips grab the harder deeper soils and the resistance becomes greater than the strength of person pulling or pushing the tool.

When a multi-bladed hand pulled tool that utilizes a straight handle such as U.S. Pat. No. 1,309,228, gets snagged and embedded in the ground, the tool cannot just be pushed back to free it. The user will have to jerk the tool to try and break the tips free from the obstruction, or, the user will have to manually lift the entire blade assembly out of the ground and then reposition it past the obstruction to continue cultivating. Thus, cultivators with blades such as those disclosed in U.S. Pat. No. 1,309,228 are impractical and ineffective for building multiple, uniform, evenly spaced rows of furrows in straight lines, as they were not specifically designed to do so.

Second, hand cultivators of the art are not ergonomically designed. In order to get depth of row furrows in multiples, with a tool that has a straight, hoe-like handle like those found in U.S. Pat. Nos. 645,702A, 1,309,228, and 1,414,087 will require a constant downward push of the handle by the user, plus a pulling or tugging effort while the user walks backwards in a body posture that is bent forward and to one side. Repeated motions in this posture are not natural to the human body and will be hard on the nerves and muscles of the lower back, the spine and the arms. Accordingly, balancing and lifting a wide front heavy tool by a straight handle, to turn it to start on a new set of rows, will become difficult as the user will not be able to control the straight hoe like handle from rotating in his hands.

Third, in order to easily build uniform furrowed rows with proportionally sized mounds, a tool must have a correct balance of design and weight working in synergy, so that all of the blades can sink evenly into the ground while separating the soil in a steady, straight, moving momentum. It has been found that light weight hand tools with straight hoe like handles that are designed with blades made from flat or concaved sheet metal are too light to sink the blades evenly into the deeper soil and are difficult to keep moving in a straight line course. Too few blades will not have enough weight to provide the downward force needed to sink the blades into the soil. Too many blades will have too many points of contact with the soil, thus blades will need more weight for them to sink enough to create the desired effect. Too much weight can sink the blades too deep making them easy to snag while also creating a greater pull resistance which will make the tool harder to pull, harder to maneuver, and harder to lift to turn it around.

Fourth, there is no hand tool that can uniformly and seamlessly join sets of completed rows in such a way, that when the plot is complete, all of the rows will be proportional in spacing, height, depth and uniformity accordingly making the rows appealing to the eye as well as functional.

Fifth, existing tools do not incorporate a practical system that will build the types of rows that will provide a platform to the Gardner where after the rows are completed, he/she can visually plan where to best place his/her crop separations in order to separate different varieties of vegetables into groups of long rows, or into neat orderly uniform blocks.

Last, the process of building rows requires hard manual work and is so time consuming with no easy way to improve or to fix imperfect or damaged rows that usually, in this situation, Gardner's will feel compelled to plant in the rows they ended up with, no matter how shallow, how crooked or how imperfect the rows turned out.

U.S. Pat. No. 4,484,635 to Sidlo discloses a garden row making tool which has a pointed blade on one end and a shovel on the other end of a rail. The tool will not produce multiple uniform proportional rows of mounds and furrows for planting seeds. U.S. Pat. No. 5,372,205 to Velez discloses a furrow covering hoe for one-handed operation. Like U.S. Pat. No. 4,484,635, the tool described will not make rows of mounds and furrows. U.S. Pat. No. 3,332,376 to Saunoris et al discloses a row making device which includes lateral and longitudinal runners for forming rows in planting beds. This device is cumbersome and usable at best in small plots of soil. Troy Bilt Hiller Corporation and Brinley Corporation sell blades which attach to an apparatus that is pulled by a powered or motorized machine such as a tractor or tiller. These blades are not attachable to a known hand-operated tool that will assist a user to easily and quickly make multiple uniform rows of uniform mounds and furrows.

A need continues to exist for a hand tool which can quickly and easily build uniform garden rows consisting of, straight rows of mounds and furrows which facilitate the many facets of planting a garden. Embodiments of the disclosed invention solve all of these aforementioned problems.

SUMMARY

The tool and in particular, blades of the portable, hand pulled, garden row making tool herein described, are configured to rapidly, build sets of rows consisting of multiple, straight, evenly spaced furrows of proportional depth, in combination with corresponding rows of straight, evenly spaced, soil mounds of proportional height, and also, to seamlessly join all of the row sets that were created in such a manner where an observer will not be able to tell where one set of rows ends and the other set begins. The unique tool is designed to make rows that will facilitate the planning and planting of seeds in a garden plot where the soil has previously been machine tilled with a motorized garden tiller to a depth of four inches or greater.

This practical tool is easy to operate and can used by an average skilled person of teen age years or greater and average strength, to build usable garden rows. To use, once the soil is tilled, a Gardner will place the tool where the first rows are preferred and pull, while walking backwards, the tool through the soil. If the rows created are damaged or are not acceptable for any reason, the rows can be easily fixed or completely re-made with very little time lost. Rows created by the inventive tool give the Gardner the option to plant on the tops of the row mounds or inside the row furrows. The channeled furrows will maximize conservation of available irrigation water by evenly saturating the soil around the seeds and seedlings. The furrows will continue to channel water to the roots systems of the plants during irrigation as they grow and until the plants are ready for harvest.

Dividing or sectioning off rows created by this tool, into smaller blocks to accommodate different varieties of vegetable seeds is easy to do. The Gardner can plan a more realistic seed layout while actually looking at his plot after all of the rows have been built.

The disclosed tool is comprised of a wide pull handle assembly that is elongated to over 5 feet in length. The long handle configuration is attached to the center of a rail that holds symmetrical blades. Preferably, there is no center blade located in the middle of the tool. Each blade is designed to work in conjunction with the adjacent blade so that each blade will create one furrow while raising the displaced tilled soil into a proportionally sized mound that will form in between the two blades as the tool is pulled.

The tool as designed has a preferred weight of about 18 pounds. This is sufficient to build rows in a tilled plot without any added weight, but an alternate feature of the tool provides for support of two weight disks, of up to 10 pounds each, that will be evenly distributed to both sides of the tool blade assembly.

DETAILED DESCRIPTION OF PREFERRED EMBODIMENTS

The inventive tool is portable and can be assembled and dissembled for transport or storage by hand without any additional tools. The tool will make and seamlessly join rows of sets of furrows and mounds that will facilitate the planting of seeds in a plot where the soil has been machine tilled to a depth of four inches or greater. Each blade works in conjunction with the adjacent blade to each create one furrow while raising the displaced tilled soil into a proportionally sized mound of soil that forms in between the two blades as the tool is pulled.

Figure 1:
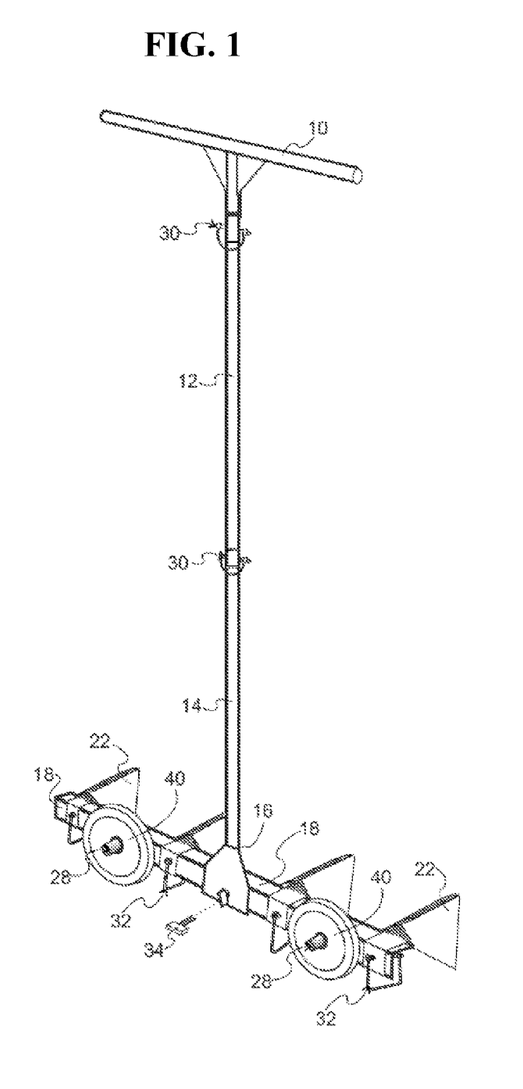
FIG. 1 is a front perspective view of an embodiment of the invention.
Figure 5:
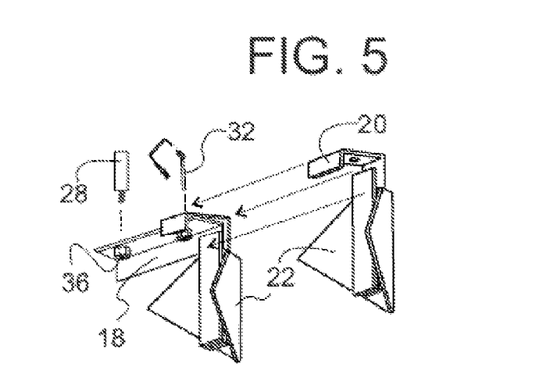
FIG. 5 is a bottom view of the inventive blade as it attaches to the rail.

Referring to FIG. 1, a blade 22 is preferably not attached to the center of this tool. The tool comprises detachable T shaped pull handle 10 coupled to shaft extension 12 with wire lock pin 30. Shaft extension 12 is coupled to rail shaft 14 with wire lock pin 30. Rail shaft 14 is fixedly attached to rail support bracket 16. The bracket can be attached by any means known in the act but welded has been found most suitable to fixedly attach to the support. Rail support bracket 16 is attached to rail 18 with hand turn screw 34 that is routed thru a hole in center of rail 18 to nut 36 as shown in FIG. 5. In another embodiment, a plurality of nut 36 can be secured such as per welding, on to rail 18 to permit a plurality of blades 22 to be attached onto rail 18 with a plurality of hand turn screws 34.

Figure 2:
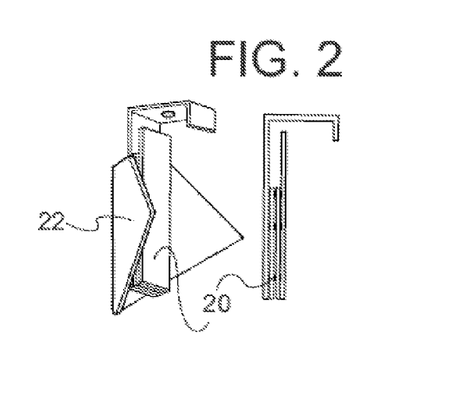
FIG. 2 is an attachment view of the support bracket of the inventive blade.

As shown in FIG. 2, the complete assemblage of blade 22 is comprised of a channeled L shaped slide bracket 20 that is centered, and fixed to the back of blade 22, wherein the two pieces are joined and together may be referred only as blade 22.

Figure 3:
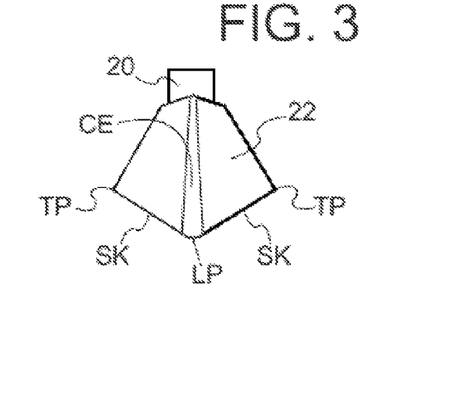
FIG. 3 is a front view of the inventive blade.
Figure 4:
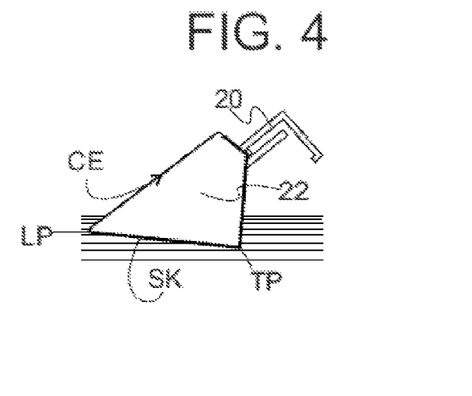
FIG. 4 is a side view of the inventive blade.
Figure 6:
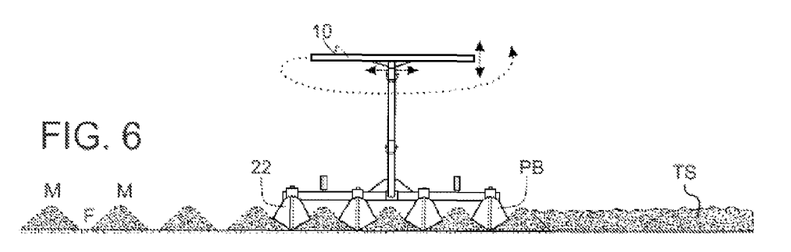
FIG. 6 is a view of the tool shown from a user's perspective.
Figure 8:
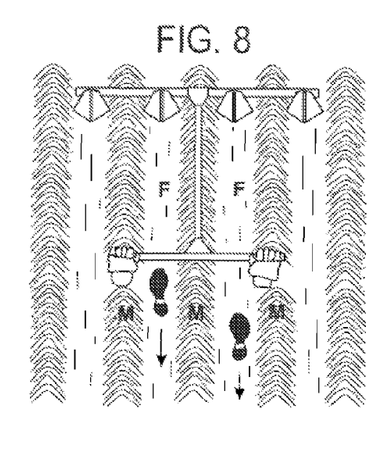
FIG. 8 is a view of the tool from an overhead perspective.

Referring to FIGS. 2, 3 and 4, blade 22 can be fabricated from ⅛" thick steel plate that is cut to a shape of an irregular pentagon and further bent in half at its center to about a 90° angle. The shape of the blade is transformed to a first and second section. The first and second sections are quadrilateral shaped with no equal sides and no parallel sides, and when combined with their respective smoothly rounded common edge CE form an acute angle. That common edge CE of the two sections of blade 22 is angled back to a slant of about 135 to 140°, as measured with a protractor and the blade is placed on a flat surface and measured upward, from the lead point (LP). The slant will pull the blade downward into tilled soil TS to form a furrow F, while dividing and lifting the soil to form two proportionally sized mounds M on each side of the furrow F as shown in FIGS. 6 and 8. The two sections at the base of the blade, at their lowest edges, form a hollow triad with an angle of about 65°, and trail outward from the leading point LP to end as the blades two trailing points TP. Those two edges of the triad become the blade skids SK.

Figure 7:
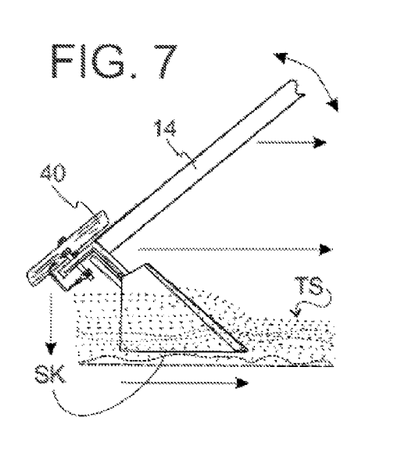
FIG. 7 is a side view of the blade shown in use.

Referring to FIG. 5, the channel bracket 20 slides over the angled iron that makes up rail 18 and is secured with wire lock pins 32. The channel can also be secured with screws or other type mechanism allowing the bracket to be loose or tight. It is preferred that bracket 20 remain slightly loose fitting. This loose fit gives each blade 22 an independent ability to move slightly or jiggle. As shown in FIG. 7, as the skids and the two trailing points TP slide over the contours of the lower harder untilled dirt, this slight independent wiggle in plurality causes a vibration in the tool which assists the blades to break through or skip over minor soil obstructions. The vibration will also help to prevent any single blade from snagging or turning the straight line movement direction of the tool. If desired by user, the blades can also be secured tightly with a screw or other means to keep the blade from moving.

The contact edges of the triad skids SK along with the two trailing points TP will slide nearly flat over the lower harder untilled dirt and serve to prevent the tips of blades 22 from burring and locking themselves into the deeper ground. Small granules of loose soil are forced under the blades and provide lubrication to lessen the drag resistance of blade 22 which allow the tool to be pulled easily. This interaction of blade 22 with the soil makes this tool produce rows extremely fast. In tilled soil a Gardner of average cardiovascular health and of teenage years of age or older can build continuous straight rows of furrows and mounds at an average speed of about 1½ feet to 2 feet per second.

In an alternate embodiment, a third blade 22 and a fourth blade 22 are connected to rail 18. First and second blades 22 create two furrows of proportional depth with a joined mound in between them. Second and third blades 22 create two furrows of proportional depth with a joined mound in between them. Third and fourth blades 22 create two furrows of proportional depth with a joined mound in between them. This embodiment having four blades on rail 18, will create one set of rows consisting of four furrows of proportional depth and three mounds of soil of proportional height.

To work the inventive tool in soil that is badly cultivated either by hand tools, or by a machine that leaves large clumps of broken dirt, a downward force is needed to form the rows. The downward force upon Blades 22 can be adjusted by adding weight 40 to two support rods 28. Support rods 28 can be routed thru holes in rail 18 and secured or screwed into nuts 36 as shown in FIG. 5, wherein weight 40 can be attached onto weight support rod 28.

Weight support rods 28 are configured to each accommodate a weight disk 40 that can weigh up to 10 pounds. The amount of weight added to the tool is dependent on how well the soil has been tilled. In addition, the respective working angle of the leading point of blade 22 can be changed by lifting or lowering the T-pull handle 10, wherein the two trailing points TP will serve as fulcrums to lift the tips of blade 22 upwards while supporting the added weight.

Referring to FIG. 1, the ergonomic T-handle 10 is constructed of 1 inch steel tubing that can be at a length from 20 to 22 inches to be equally divided on each side from the tools center shaft. The T handle is secured to handle support shaft 12 for example by welding, and further secured with corner supports fabricated from 2 inch flat stock. While steel is the preferred material for the tool and in particular the handle, other materials can be used for making the tool. For example, other metals such as galvanized pipe, aluminum, sturdy plastic, fiberglass, wood, and combinations thereof. The handle can be the same or a different material than the rail and blades without limiting the utility of the invention. It is recommended, but not mandatory, that the material chosen be of a rust-resistant nature.

T-handle 10 is perforated with a lower handle shaft hole. Shaft extension 12 comprises an upper shaft hole. Wire lock pin 30 can be inserted through the lower T-handle shaft hole, and the upper shaft extension 12 hole to join and secure the two shafts together.

Shaft extension 12 further comprises a lower shaft hole. Similarly, rail shaft 14 comprises an upper rail shaft hole. Wire lock pin 30 can be inserted through the lower shaft extension 12 hole and the through the upper rail shaft 14 hole to join and secure the two shafts together. Alternatively, the shaft can be of a telescoping design with standard lock mechanism known to those of skill in the art.

In considering fatigue or injury to the users lower back, T-handle 10 is configured to comfortably divide the pull effort equally to both hands and arms so that the user pulls with a straight body posture thus shifting the hardest work effort to the leg muscles which will provide most of the strength required to work the tool. The two wide point grip position of the user's hands as demonstrated in FIG. 8, together with the wide set ground contact of the plurality of blades 22 stabilize the tool, giving the user a safe, steady handle to hold with both hands as he/she builds garden rows. The handle can be optionally cushioned with grips for increased comfort during use. It can also have a non-slip grip type of covering on the handle.

The connecting point between rail support bracket 16 and rail 18 becomes the tools' center of balance. The total working length of the tool including T-handle 10, the shaft extension 12 and the rail shaft extension 14 can be between 4.0 feet to 7 feet in length. The length can vary upon user's preference with a preferred length of 5.5 feet to 6 feet.

A straight line pull is naturally achieved by the elongated shafts of the tool working in synergy with the resistance and the equilibrium effect of blades 22 as they are dragged (while user is walking backwards) thru the tilled soil TS. The result is that the tool will follow the user's desired direction. A shift of the T-handle 10 to the right or to the left will turn the direction of rail 18, which gives the user an ability to make corrections to the straightness of the rows as he pulls the tool as shown in FIGS. 6 and 8.

When working the tool in rough or course soils such as moist tilled clay, the slant angle of blade 22 can be adjusted to drive the tips of the blades further into the soil by lowering T-handle 10. A lift and a twist of T-handle 10 can cause the blade 22 to turn upward and or to the side so that the tool can be maneuvered over or around obstructions without having to lift the entire blade assembly.

The inventive tool is configured with an even number of blades 22 which are spaced evenly along the rail, with the center space left open or blank and is used to form the rows of mounds. The inventive tool does not have a blade 22 attached to the middle or central point of the rail. A first blade 22 and a second blade 22 are connected to the right and to the left of the center point of rail 18 and are configured to create furrows F to the right and to the left of center while simultaneously creating one mound M of soil that will be left raised and centered between the two furrows F at the middle point of the tool, as shown in FIG. 6.

The placement of two blades 22 to the right and to the left from the center point of rail 18 is significant in that a user can re-work the tool over any rows to deepen furrows F, to heighten mounds M, or to correct damage or imperfections to the rows while naturally walking inside the two furrows F to the right and left of the tools center. Thus, the user will not step on the existing mound M that runs under the tools center point, as demonstrated in FIG. 8. If when completed, any of the rows are not acceptable for any reason, the rows can be fixed or improved without damaging existing mounds, or all rows can be completely re-made with very little time lost.

While two blades 22 and four blades 22 are preferred for the tool described it is possible to incorporate an odd number of blades 22 into the tool; this is at user's discretion. There may be some adjustment of the pulling mechanism required of the tool with an odd number of blades on the rail. It is also recognized that more blades 22 can be added by adjusting the size of rail 18.

Figure 9:
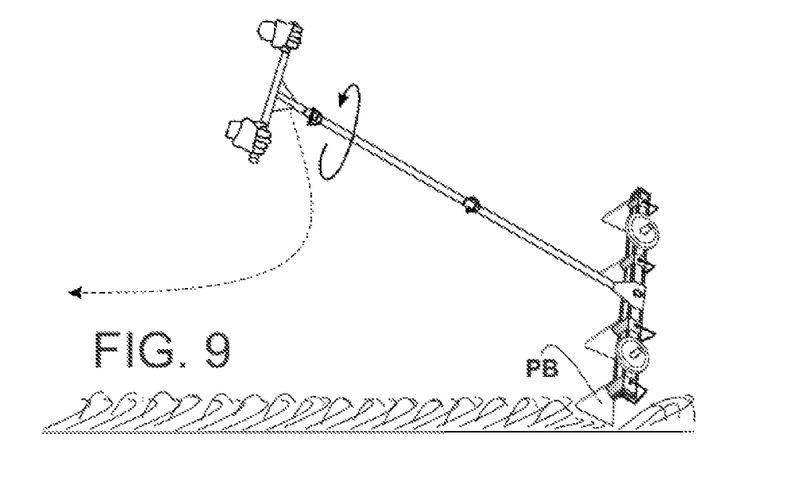
FIG. 9 is a view of the invention as it is being pivoted and turned around.
Figure 10:
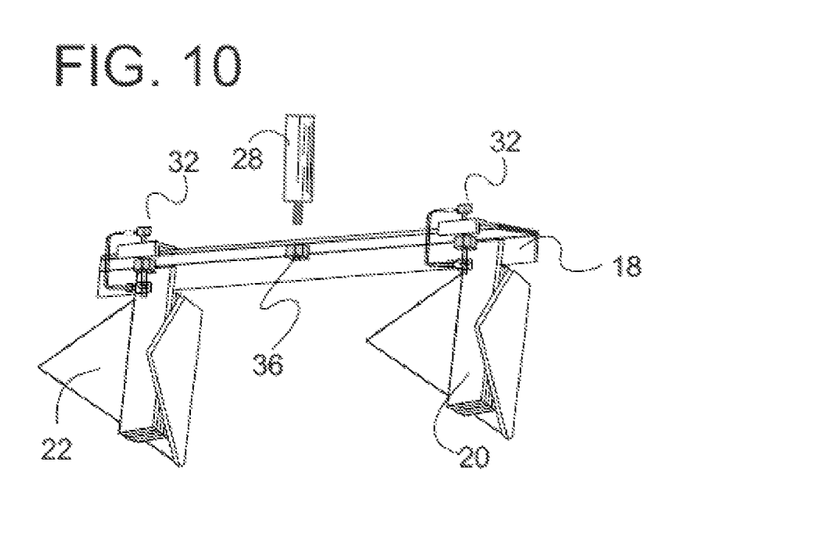
FIG. 10 is an assembly view from behind the rail of the tool.

Another significant feature of inventive tool is found in the turning of the tool to face it in the opposite direction so as to build a new set of furrows and mounds after one set has been completed as shown in FIGS. 6 and 9. By using the leverage of the wide T-handle 10, the user can easily twist and pivot the tool on either of the outer blades 22 in order to rotate it to the opposite direction. The tip of the pivot blade PB will support the heaviest weight of the tool as it is turned around, thus eliminating the need to manually lift the multiple bladed tool to turn it. As shown in FIGS. 6 and 9, as the tool is turned, the tip of pivot blade PB will spin inside the furrow that it created and will automatically align and center itself into a ready position when the turnaround is completed. The end blades in the rail serve to also be the pivot blades during use of the tool.

The independent movement of each blade assists in pivot action for turnaround of the tool in the opposite direction.

The user can start the next set of rows without having to re-position or re-align the blades. As the next set of furrows are started, the tip of the pivot blade PB will drag in a straight line inside the deepest part of the furrow that it created, which will serve as the straight line guide for the new set of rows. When the process is repeated, all sets of furrows and mounds will run parallel and uniform with each other and will be seamlessly joined in appearance, proportionality, and function.

This pivot turning feature makes this inventive row building tool extremely efficient. In tilled soil the average turnaround time for a Gardner in good health and of teenage age years or older, and of average strength is about 8 to 12 seconds per turn.

To demonstrate the tools' efficiency while building rows in a 40' long×30' wide garden plot, a Gardener in good health was able to build 33 rows in the tilled soil for the plot as follows:

Female, 30 yrs, 5 minutes, 20 seconds;
Male, 32 yrs, 4 minutes, 15 seconds;
Male, 57 yrs, 4 minutes 22 seconds.

Figure 12:
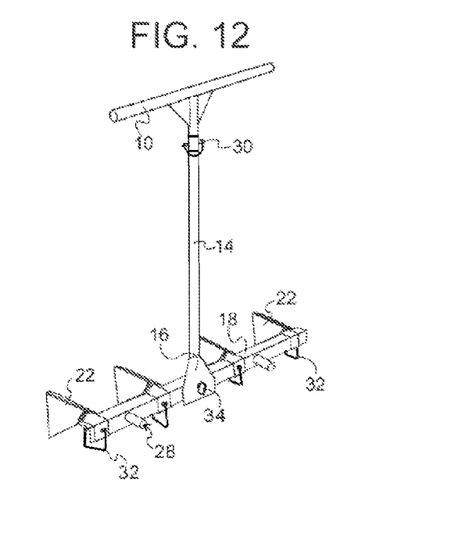
FIG. 12 is an embodiment of the tool at reduced length.

To work the tool in limited spaces, an alternate embodiment is shown in FIG. 12 where T handle 10 is directly connected to rail shaft 14. It may be preferable to omit shaft extension 12 and connect T handle 10 directly to rail shaft 14 by inserting wire lock pin 30 through the lower T-handle 10 shaft hole and the upper rail shaft 14 hole to join and secure the two shafts together.

Figure 11:
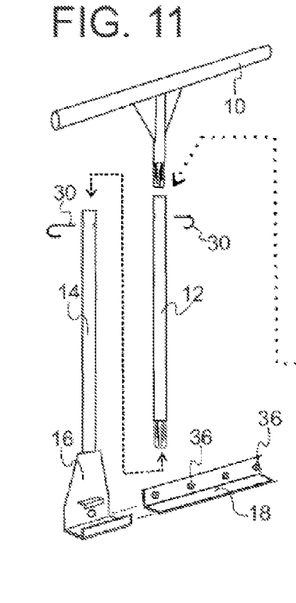
FIG. 11 is an assembly view of the T-handle assembly.
Figure 11A:
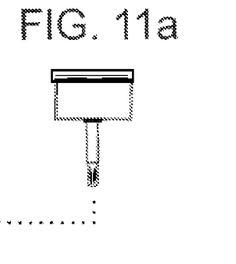
FIG. 11a is a view of an alternate D-handle.

While the handle has been described as a T handle, an alternate type of handle such as D handle FIG. 11*a*, can be used with the inventive tool. It has been found that a D handle works well in conjunction with a two blade 22 configuration or for a smaller version of the tool for use in small gardens. This does not limit the tool with a D handle to only two blades. The D handle can be used with more than two blades on the rail 18, but it may require more strength and dexterity to use the tool than.

While the wire lock pin is described herein for making the tool easy to assemble, alternatively, the tool can have the T handle and shafts permanently secured if desired.

While explained as a portable, hand-assemble-able tool, if desired, all parts of the tool can be permanently attached.

Figure 13:
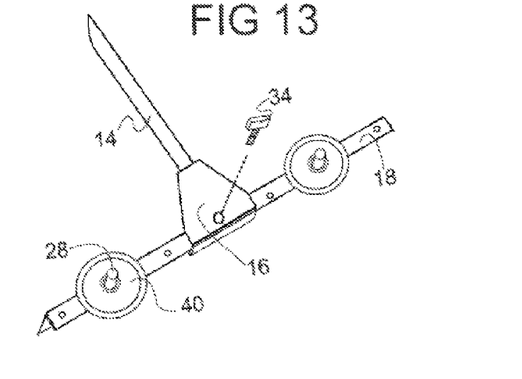
FIG. 13 is an embodiment of the tool for use as a soil drag.

As shown in FIG. 13, in a further alternate embodiment, blades 22 can be removed from rail 18 leaving only T handle 10, shaft extension 12, rail shaft 14, and rail 18 with attached weight support rods 28. By adding optional weight disks 40 to the weight support rods, the tool can function as wide soil drag to smooth out the tilled soil prior to building rows.

After the rows have been completed, the rows of mounds and furrows are ready for immediate planting. The Gardner can divide the plot in halves or in quarters with a bow rake. The Gardner will have the option to plant in straight lines inside the rows of furrows or over the tops of the elevated soil mounds. He/she can neatly separate plant varieties with walk paths created by raking down one row between seed lines. Distance between plant rows can be uniformly increased by skipping one or two rows between lines of seeds.

Referring to FIG. 3, as described, the preferred tool has the following dimensions:

Handle 21.5"
Rail 32"
4-Blades spacing 10 inches apart on the rail with no center blade wherein the preferred blade comprises
CE=5.5 inches
TP to LP=4.5"
TP to TP=5.5"
TP towards support rod 20=3.5"
TP to TP=5.5"
Angle at LP=about 65 degrees at lower rounded blunt edge
Slant of CE=approx. 135-140 degrees This design has been found to be comfortable to handle and maneuver through tilled soil. However, it is recognized that the tool can be resized to become increased or reduced in a proportionate fashion. Likewise, as mentioned previously while 2-4 blades are preferred for making 2 or 4 rows of mounds and furrows, 6 blades may be used on a longer rail. A further alternate design involves the spacing between the blades. While a blade spacing of 10 inches on center is preferred, the spacing can be anywhere from 3 to 7" so as to adjust the height and width of the mounds. The preferred tool will produce mounds and furrows having about a 10" spacing from the center point mound to mound, before watering the soil. Thus one skilled in the art can see that placing the blade in a different position on the rail will alter the height and separation of the mounds.

Persons of ordinary skill in the art may appreciate the standalone capabilities of the unique Garden row building tool placed isolated from others by its own merits, and enjoy the functional benefits of the inventive systems. Thus, given the embodiments of the present invention the scope of the invention is reflected by the breadth of the claims below rather than narrowed by the embodiments described above.

What is claimed is:

1. A row making tool that is configured to make a first set of straight rows of furrows with corresponding mounds of proportional height, depth, and width in a tilled soil, the tool comprising:
   a rail;
   a rail shaft attached to the rail, wherein the rail shaft is attached to a central point of the rail;

a handle attached to the rail shaft, wherein the handle is configured to be held and maneuvered with a human hand; and at least first through fourth blades that are attached to the rail, provided no blade is placed at the central point of the rail, wherein the first and second blades are attached on a first side of the central point of the rail and the third and fourth blades are attached on a second side of the central point of the rail, wherein the first through fourth blades are equidistant to each other on the rail, and wherein each blade of the first through fourth blades comprises:

first and second sections, wherein each of the first and second sections is of an irregular quadrilateral shape wherein the first and second sections have a smoothly rounded common edge therebetween, wherein the first and second sections form an angle therebetween at the smoothly rounded common edge, wherein the smoothly rounded common edge forms a slant when each blade is placed on a flat surface, and wherein the slant forms an angle of about 135 to 140 degrees with the flat surface in a direction in which the row making tool is pulled through the tilled soil, wherein edges of the first and second sections are sufficiently blunt to flow through the tilled soil; and a slide bracket that is attached to the first and second sections of each blade, wherein the slide bracket secures the respective blade to the rail, and facilitates the blade to slide on the rail, wherein the first through fourth blades create the first set of straight rows of furrows with corresponding mounds when the row making tool is pulled through the tilled soil, and wherein rows of the first set of straight rows of furrows with corresponding mounds are equidistant from each other and parallel.

2. The tool of claim 1, wherein the first and second sections of the blades comprise a leading point (LP) at a tip of the smoothly rounded common edge, and wherein the edges of the first and second sections form an angle of about 65 degrees at the LP.

3. The tool of claim 1, wherein the row making tool is turned in an opposite direction by pivoting on at least one of the blades which is placed on an outer end of the rail, and wherein this blade placed on the outer end supports weight of the row making tool when the row making tool is turned around in the opposite direction.

4. The tool of claim 1 further comprising first and second support rods that are attached to the rail, wherein each of the first and second support rods accommodate weight disks.

5. The tool of claim 4, wherein each of the weight disks is of 2 to 20 pounds (lbs).

6. The tool of claim 3, wherein the first through fourth blades create a second set of straight rows of furrows with corresponding mounds when the row making tool is turned by pivoting and pulled through the tilled soil, wherein the first and second sets of straight rows join seamlessly.

7. The tool of claim 1, wherein the handle is T-shape.

8. The tool of claim 1, wherein the handle is D-shape.

* * * * *